United States Patent [19]

Pryor et al.

[11] Patent Number: 5,344,169
[45] Date of Patent: Sep. 6, 1994

[54] MULTI-POLE SUPPORT STAND

[75] Inventors: John W. Pryor, Oceanside; Jeffery W. Pryor, Vista; Jack W. Ratcliff, Carlsbad, all of Calif.

[73] Assignee: Pryor Products, Oceanside, Calif.

[21] Appl. No.: 9,655

[22] Filed: Jan. 27, 1993

Related U.S. Application Data

[63] Continuation-in-part of Ser. No. 826,012, Jan. 27, 1992, abandoned.

[51] Int. Cl.$^5$ .......................... A47G 21/00; B62B 3/10
[52] U.S. Cl. .................................. 280/79.3; 5/503.1; 5/658; 248/129; 280/47.35
[58] Field of Search ............... 5/503.1, 658, 662; 248/129, 167; 280/47.16, 47.2, 47.33, 79.11, 292, 304.1, 767, 79.3, 47.34, 47.35

[56] References Cited

U.S. PATENT DOCUMENTS

| | | | |
|---|---|---|---|
| 1,773,237 | 8/1930 | Naujoks et al. | 248/167 |
| 2,921,763 | 1/1960 | Miller et al. | 248/167 X |
| 3,807,750 | 4/1974 | Brown | 280/79.11 X |
| 3,835,486 | 9/1974 | Benoit et al. | 5/503.1 |
| 4,266,765 | 5/1981 | Sandoval | 482/68 |
| 4,624,245 | 11/1986 | Mullin et al. | 5/658 X |
| 4,744,536 | 5/1988 | Bancalari | 248/125 |
| 4,804,162 | 2/1989 | Rice | 248/129 X |
| 4,832,294 | 5/1989 | Eidem | 248/129 X |
| 4,945,592 | 8/1990 | Sims et al. | 5/658 |
| 5,117,521 | 6/1992 | Foster et al. | 5/503.1 X |

OTHER PUBLICATIONS

"OMNI-Pal" Pryor Products 1990.

*Primary Examiner*—Margaret A. Focarino
*Assistant Examiner*—Michael Mar
*Attorney, Agent, or Firm*—Brown, Martin, Haller & McClain

[57] ABSTRACT

A mobile support stand for hospital equipment has a plurality of poles projecting upwardly from a wheeled base with IV hangers at the upper ends of the poles. The base has a span sufficient to provide the needed stability against tipping, with legs projecting outwardly from the base with wheels at their free ends for supporting and transporting the stand. At least one of the legs is retractable between a fully extended, operative position and a retracted, non-extended position. A securing mechanism allows the stand to be secured to existing mounting holes on a hospital bed with the retractable leg facing outward, and once the stand is secured to the bed the retractable leg is retracted out of the way so that the floor space taken up by the bed and attached stand is minimized.

6 Claims, 2 Drawing Sheets

MULTI-POLE SUPPORT STAND

CROSS-REFERENCES TO RELATED APPLICATIONS

This application is a Continuation-In-Part of co-pending application Ser. No. 07/826,012, filed Jan. 27, 1992 now abandoned.

BACKGROUND OF THE INVENTION

The present invention relates generally to mobile support stands of the type used to support and move various types of equipment, and is particularly concerned with the type of support stands used in the medical field such as wheeled IV stands with hooks for suspending IV's and optionally supporting other medical equipment such as pumps and monitors.

Mobile support stands are well known in the medical field in which a relatively long vertically extending pole is mounted on a wheeled base for moving the equipment between different locations. The base must be relatively broad so as to support the equipment without tipping even when transported on a ramped surface.

Single pole mobile support stands of this type typically have a wheeled base of relatively small area. Multiple IV stands are often needed for critically-ill patients requiring a larger number of IV's and monitors. Multiple pole IV stands are known which have up to four IV poles on a single wheeled base. These stands have to have a relatively broad wheeled base in order to provide a stable support for the weight of IV's and medical equipment carried on the stand, so that the stand does not tend to tip over. These stands have an elongate base with legs projecting outwardly in opposite directions from each end of the base, each leg carrying a caster or wheel. The leg must have a relatively wide span to provide the needed stability, and thus the stand takes up quite a lot of room beside the bed, reducing access to the patient. In some cases, the stand is secured to the bed via cable ties, which is inconvenient. Also, if a bedridden patient must be moved for treatment purposes, the stand must be moved with the bed and will take up an excessive amount of room in hospital corridors and in elevators and is very hard to maneuver single handedly by one individual. Typically, up to three and sometimes four attendants are needed to transport a person in bed with multiple IV stands.

SUMMARY OF THE INVENTION

It is an object of this invention to provide a new and improved multi-pole support stand.

According to the present invention, a multi-pole support stand is provided which comprises a base, a plurality of poles extending upwardly from the base, and a securing mechanism for securing the stand to a support such as a bed frame. The base has a central portion on which the poles are mounted and a plurality of legs extending outwardly from the central portion, the legs carrying wheels at their outer ends. At least one of the legs is extendably mounted on the stand for movement between a retracted, inoperative position and extended position projecting outwardly in a first direction from the central portion of the base.

The extendable leg is retracted when the stand is secured to a bed or other support to provide more space, and is extended to provide the required stability for the support stand when the stand is loaded and wheeled from one location to another separate from the bed or other support. In one preferred embodiment of the invention, the securing mechanism comprises adjustable mating pieces for mating engagement with standard mounting bores provided on most hospital bed frames. If such bores are not a standard option of a particular model bed, the bed may be retrofitted by attaching a mounting bar having bores at each end to the back of the headboard. The mating pieces are slidably mounted on the stand for both horizontal and vertical movement relative to the stand so that they can be adjusted into alignment with bed frame mounting bores before securing in place without needing to lift the stand from the floor.

In one preferred embodiment of the invention the base of the stand comprises an elongate member or bar having a pair of relatively short legs transversely projecting in opposite directions at each end of the bar, each leg carrying a wheel, and a pair of longer transversely projecting stabilizer legs projecting in opposite directions from a central portion of the elongate member. One of the longer, stabilizer legs is pivotally mounted so as to be moveable between a retracted position generally parallel with the elongate member and an extended position projecting transversely outwardly. The stand can be secured to the bed with the extendable leg outermost while the other long stabilizer leg projects out of the way under the bed. The extendable leg is then retracted so that the stand takes up relatively little space on the floor adjacent the bed, since the legs at each end are relatively short while the central, longer stabilizer legs are designed to give the desired span for lateral stability when the stand is self-supporting. The shorter legs are designed so that the bed wheels may pivot without interfering with the stand legs when the stand is hooked up to a bed.

A plurality of poles project upwardly at spaced intervals from the elongate base member. These poles may have IV hangers at their upper ends, but in the preferred embodiment of the invention an intermediate rail member is secured transversely across the upper ends of the base poles, and a second set of poles projects upwardly from the intermediate rail member, with the securing mechanism being mounted on the intermediate rail member for securing the stand to a bed. The second set of poles each have IV hangers at their upper ends, and other equipment may be supported on the base poles as well as the second set of poles, as desired. Thus, a considerable weight of equipment may be easily, stably and conveniently supported at the bedside of a critically-ill patient without interfering with access to the patient by medical personnel when necessary.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DESCRIPTION OF THE PREFERRED EMBODIMENT

Figure 1:
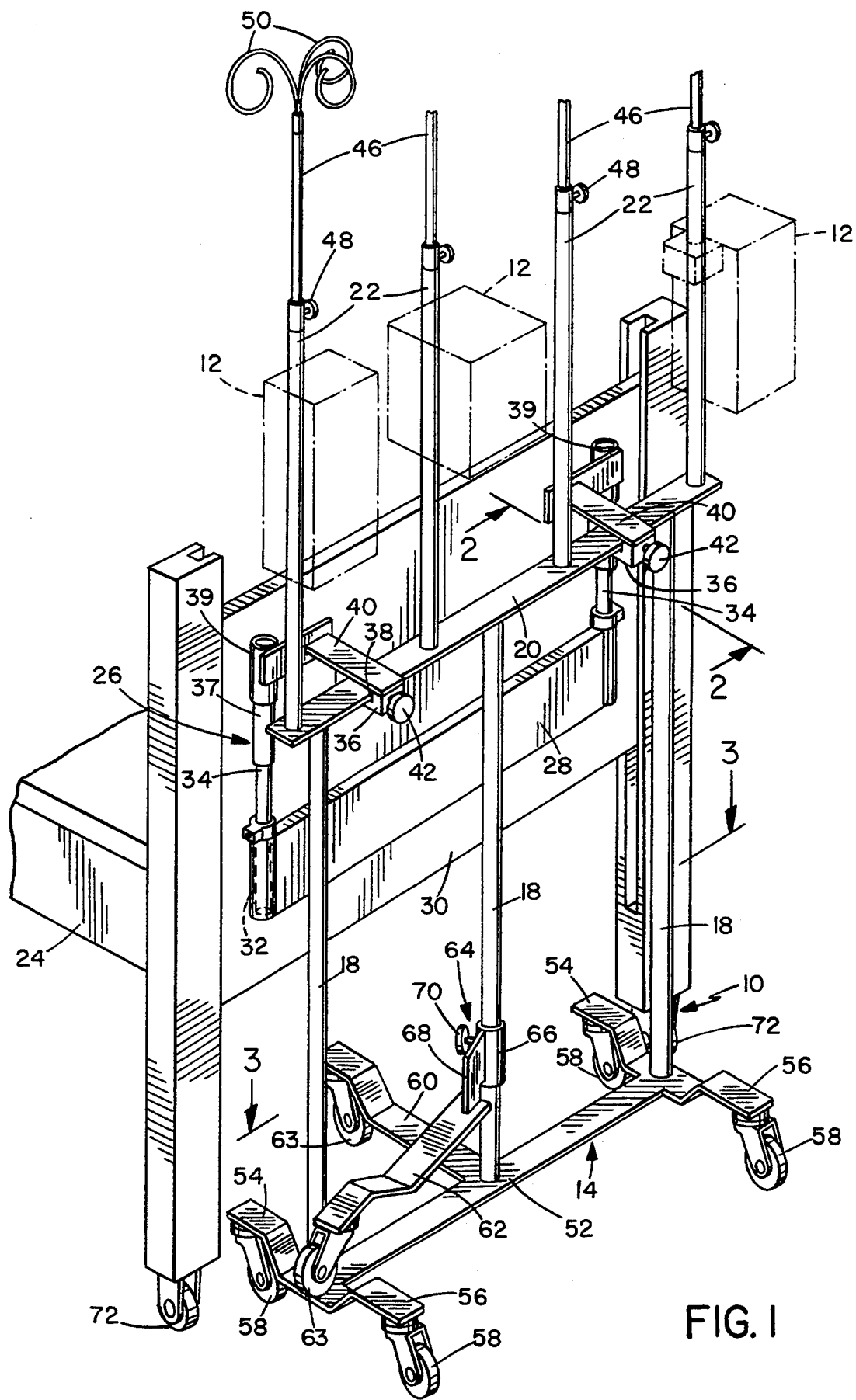
FIG. 1 is a perspective view of a multi-pole IV stand according to a preferred embodiment of the invention attached to a typical hospital bed, with one support leg retracted.

The drawings illustrate a multi-pole mobile support stand 10 for supporting and transporting medical equipment 12 such as pumps, monitors, oxygen tanks, electrical connector strips, IV bottles and IV instruments. The stand has a wheeled base 14 and a plurality of poles extending upwardly from the base for supporting instruments and equipment. The poles include a first set of three lower poles 18 extending directly up from base 14 with an adapter rail or bracket 20 extending transversely across their upper ends, and a second set of upper poles 22 extending upwardly from bracket 20. In the illustrated embodiment there are three lower poles and four upper poles, although a greater or lesser number of poles may be provided in each set, depending on the amount of equipment to be supported.

Figure 2:
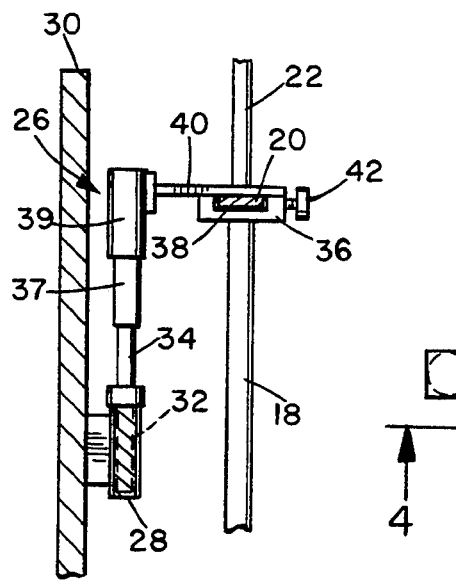
FIG. 2 is a sectional view taken on line 2—2 of FIG. 1.

The stand is adapted to be attached to the head or foot of a hospital bed 24 via an adjustable securing mechanism 26 slidably mounted on rail or bracket 20. Hospital beds typically have mounting bars 28 secured to the back of headboard 30 with holes 32 at each end for receiving IV poles and the like. The securing mechanism 26 comprises a pair of downwardly-directed, telescoping connector pins or poles 34 slidably mounted on slide rail or bracket 20 via slider members 36 for mating engagement in the respective mounting holes 32, as illustrated in FIGS. 1 and 2. Each slider member 36 has a slot 38 for sliding engagement over rail 20 between two of the upper poles 22 and an L-shaped connector piece 40 projects transversely to one side of rail 20. Each pin 34 is telescopically mounted in tube 37 which in turn telescopes into upper tube 39. Tube 39 is secured in a vertical orientation at the outer end of each connector piece 40. The pins 34 extend telescopically out of tubes 37 and 39 so that they depend vertically downwardly from the rail 20 in a plane parallel to and offset from the plane of the stand 10, as best illustrated in FIG. 2. The pin 34 and tube 37 will have enlarged heads at their upper ends to restrict downward movement out of tubes 37 and 39, respectively. A releasable locking pin 42 extends transversely through one end of slider 36 into the slot to lock the slider in the desired position.

This securing mechanism 26 allows the multi-pole stand to be securely attached to a hospital bed quickly and easily, so that it is held in close to the headboard and can be transported with the bed as one unit with the wheels 58 on the ground, for example when a patient under intensive care must be moved from one location to another for treatment. The slider devices 36 are simply released and the connector pins or poles 34 are moved outwardly or inwardly and telescoped upwardly into tubes 37 and 39 until they can be aligned above the respective mounting holes 32. The pins are then dropped into engagement with the bores, as illustrated in FIGS. 1 and 2. If the bed height is adjusted, the wheels of the stand will still remain on the ground since the pins will telescope up into tubes 37, and into tubes 39, if necessary, to accommodate a maximum possible adjustment. Thus, the bed and stand are wheeled together as a unit with the wheels of the stand on the ground to provide stable support for the relatively large weight of equipment on the stand.

If the bed has no mounting bar 28, or the stand is to be secured to the foot of the bed, the head or foot board is simply removed and the mounting holes for the head or foot board can be used for attaching to the connector pins. Alternatively, a mounting bar 28 with mounting holes 32 can be provided for securing to any bed to allow the stand to be securely attached to the bed.

Although the securing mechanism is illustrated in the drawings for attaching a multi-pole stand to a bed, a similar mechanism may be used in alternative embodiments for securing a single pole stand such as an IV pole to a bed. A slide rail similar to rail 20 is simply secured across the IV pole at an appropriate height for access to the mounting bar 38 on the bed, with sliders as in FIG. 1 slidably mounted one on each side of the IV pole and offset, telescoping connector pins depending downwardly from the sliders for engagement in the mounting holes. The rail can then also act as a support handle for ambulatory patients.

Each of the four upper poles 22 of stand 10 is a telescopic pole having a lower tubular portion 44 in which an upper extension portion 46 is telescopically mounted, with a releasable locking pin or screw 48 for locking the extension portion 46 at the desired height, as is conventional in standard IV poles. The extension portions 46 telescope from a height of 74.5 inches to over 8 ft. from the floor. An IV hanger having mounting hoops 50 for a number of IV bottles (not illustrated) is provided at the upper end of extension portion 46. In the illustrated embodiment, three mounting hoops 50 are illustrated although it will be understood that up to four hoops may be provided on each extension portion. Other IV equipment 12 can be mounted on the poles 22 in a conventional manner via suitable clamping devices, as generally illustrated in FIG. 1, and the lower poles 18 also provide equipment mounting space closer to floor level.

Figure 3:
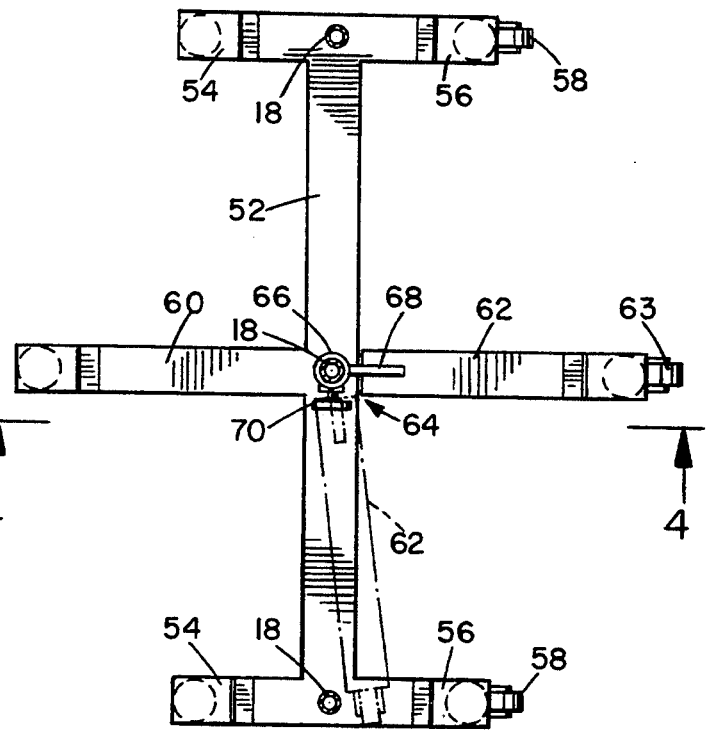
FIG. 3 is a sectional view taken on line 3—3 of FIG. 1, with the movable support leg extended.
Figure 4:
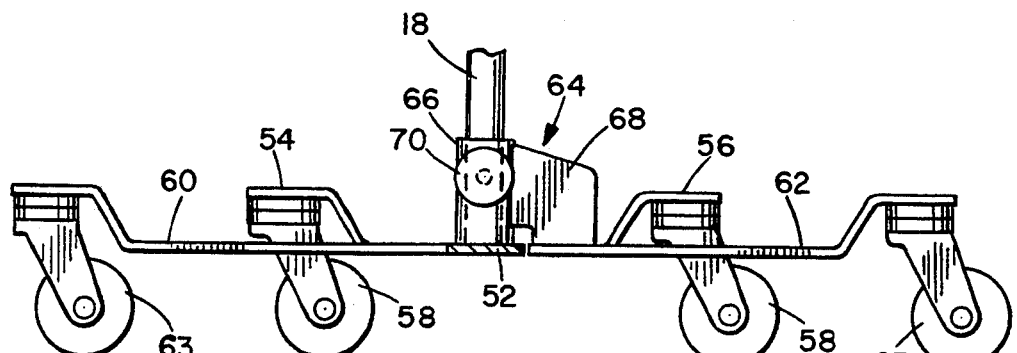
FIG. 4 is an enlarged sectional view taken on line 4—4 of FIG. 3.

Since the weight of IV bottles and equipment typically mounted on the multi-pole stand 10 will be relatively high, the base must be wide enough to provide the necessary stability to avoid or reduce the risk of tipping when the stand is not secured to a bed or other stable support. As best illustrated in FIGS. 1, 3 and 4, the base 14 basically comprises an elongate center bar 52 having a pair of short legs 54, 56 projecting in opposite directions transversely from each of its ends, each leg 54, 56 having a wheel 58 suspended from its free end as best illustrated in FIG. 1. A pair of longer, stabilizer legs 60, 62 project in opposite directions transversely from the central portion of bar 52 to provide the necessary base width to support and stabilize the stand. Each leg 60, 62 has a wheel 63 suspended from its free end. In one example, the stabilizer legs had a total span of around 28 inches (in other words each leg had a length of around 14 inches) while the shorter end legs had a total span of around 16 inches. In other words, the longer legs were around twice as long as the shorter legs. This span was found to provide the necessary stability to resist tipping on a 10 degree ramp, which is the maximum ramp angle permitted in hospitals.

One of the legs 62 is retractably mounted on the base so that it can be rotated between the extended position illustrated in FIG. 3 while the stand is separate from the bed and the retracted position illustrated in FIG. 1 and in dotted outline in FIG. 3 when the stand is secured to a bed. In the illustrated embodiment the extendable leg 62 is pivotally mounted at one end on the center pole of the lower set of poles 18 via pivot mounting bracket 64. Mounting bracket 64 has a tubular portion 66 slidably and rotatably engaging over center pole 18, and a flange 68 projecting to one side of pole 18 to which the inner end of stabilizer leg 62 is secured. A locking pin 70 extends transversely through tubular portion 66 to engage an aligned locking slot in pole 18 in the extended position.

When the stand 10 is to be secured to the bed, it is slid into position adjacent the head or foot of the bed with the fixed stabilizer leg 60 facing inwardly, so that leg 60 projects under the bed. The shorter legs 54 on that side of the base are short enough that they will not interfere with the wheels 72 or legs of the bed, as can be seen in FIG. 1. The connector poles or pins 34 are then adjusted into alignment with the mounting holes 32 on the bed, and extended downwardly into holes 32, as illustrated in FIG. 2. The sliders 36 are then locked in place. The retractable stabilizer leg 60 is then released and folded out of the way, by first releasing locking pin 70, then sliding the tubular portion 66 upwardly so that the wheel 63 is clear of center bar 52 before pivoting the leg 62 inwardly until it rests over the center bar as illustrated in FIG. 1. In this orientation the stand will take up very little floor space and will be held in closely and compactly to the head or foot of the bed with all of the other wheels of the stand on the ground, leaving the sides of the bed free for access by medical personnel.

With this arrangement, the bed and attached multipole IV stand can be transported as a single unit along hospital corridors and will fit easily into hospital elevators, since the stand 10 is held in close to the headboard or foot of the bed and the stand base takes up very little extra floor space when secured to the bed as illustrated in FIG. 1 with the retractable leg folded out of the way. The base bar, shorter end legs and the fixed stabilizer leg 60 are preferably welded in one piece from steel bar, with the separate retractable leg 62 also made from a separate piece of steel bar.

The multi-pole stand is easily and securely attached to a bed so that the stand and bed can be transported as a single unit, and medical personnel do not have to push the stand separately alongside a bed. When secured to a bed, the stand takes up little additional floor space so that it can fit easily in a hospital elevator without undue crowding, and also leaves floor space clear at a patient's bedside, which is important for critically-ill patients where quick access by medical personnel can be important. The stand has a considerable capacity for supporting a large amount of medical equipment as needed by critically-ill patients, including a large number of IV bottles and associated equipment such as monitors and pumps, as well as other needed equipment. When separated from the bed, the span of the extended and fixed stabilizer legs will be sufficient for stability against tipping as the stand is transported from one location to another.

Although a preferred embodiment of the invention has been described above by way of example only, it will be understood by those skilled in the field that modifications may be made to the disclosed embodiment without departing from the scope of the invention, which is defined by the appended claims.

We claim:
1. A multi-pole support stand, comprising:
   a wheeled base having an elongate bar with fixed legs projecting from each end and a pair of stabilizer legs extending from opposite sides of a central portion of the elongate bar, each leg carrying a wheel at an outer end thereof;
   a plurality of poles extending upwardly from the elongate bar for supporting equipment;
   a slide rail bracket attached to said plurality of poles and extending above said elongate bar; and
   securing means for securing the stand to spaced apart, vertical mounting holes of a hospital bed, said securing means comprises a pair of sliders slidably mounted on said slide rail bracket, each slider having a connector piece projecting transversely from one side of the slide rail, a hollow sleeve member affixed to an outer end of the connector piece, and a pin member telescopically received within the sleeve member and extending downwardly therefrom, each pin member being receivable in a respective one of the vertical mounting holes for securing the stand to the hospital bed.

2. The stand as claimed in claim 1, wherein one of the pair of stabilizer legs is pivotally mounted.

3. The stand as claimed in claim 1, wherein the other one of the pair of stabilizer legs is fixed to the elongate bar.

4. The stand as claimed in claim 1, wherein each one of the pair of stabilizer legs are longer than each of said fixed legs at each end of said elongate bar.

5. The stand as claimed in claim 1, wherein the poles include a central pole projecting upwardly from a central portion of the elongate bar and the pivotally mounted leg is pivotally mounted on said central pole for movement between an extended position and a retracted position parallel to said elongate bar.

6. The stand as claimed in claim 1, wherein said poles include a first set of lower poles extending upwardly from said elongate base, said slide rail bracket extending across the upper ends of said lower poles, and a second set of upperpoles extending upwardly from said slide rail bracket.

* * * * *